July 7, 1936.  C. T. WADE  2,047,046

MEAT BROILER

Filed April 14, 1934    2 Sheets—Sheet 1

INVENTOR.
Charles T. Wade.
BY
ATTORNEY.

July 7, 1936.　　　　C. T. WADE　　　　2,047,046
MEAT BROILER
Filed April 14, 1934　　　2 Sheets-Sheet 2
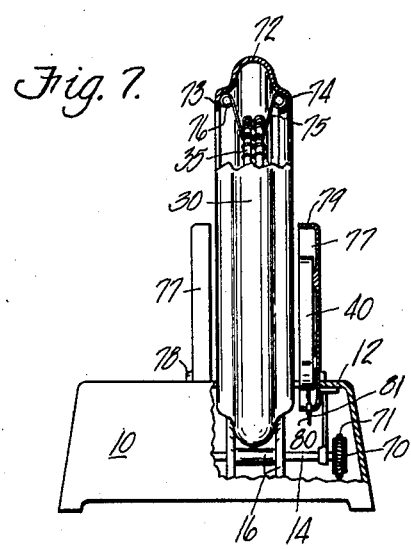
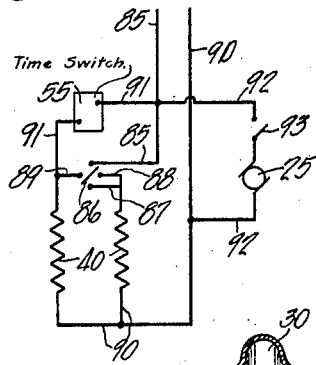
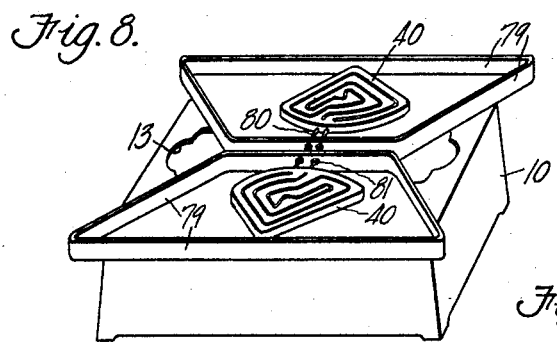
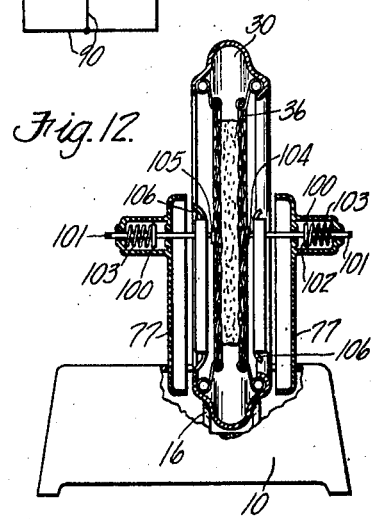
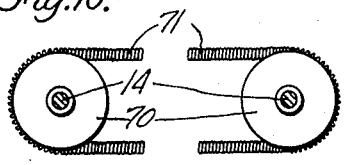
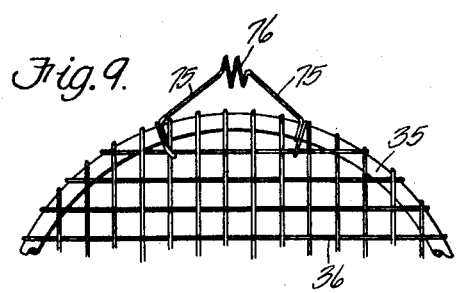
INVENTOR.
Charles T. Wade.
BY
ATTORNEY.

Patented July 7, 1936

2,047,046

UNITED STATES PATENT OFFICE 2,047,046

MEAT BROILER

Charles T. Wade, Cassopolis, Mich., assignor to The Electric Sprayit Company, South Bend, Ind., a corporation of Delaware Application April 14, 1934, Serial No. 720,624

42 Claims. (Cl. 219—19)

The invention relates to meat broilers, and has for its principal object to provide a device of this character wherein meat is moved in a predetermined path to be brought into and removed from a heating area whereby the meat will not be burned and the juices of the meat will be caused to flow to all parts thereof to automatically baste the same.

A further object is to provide a device of this character having a movable meat carrier which is readily removable therefrom.

A further object is to provide a device of this character having a vertical grilled meat carrier and heating elements disposed on each side of said carrier.

A further object is to provide a device of this character with a rotary meat carrier and a heating element of sector-shape disposed adjacent the lowermost portion of said carrier.

A further object is to provide a device of this character having a normally vertically disposed heating element shiftable to horizontal position to serve as a hot plate.

A further object is to provide a motor driven cooking device of this character with time controlled means for controlling the motor and heating element and with means for controlling said heating element independently of said motor.

A further object is to provide a device of this character with a meat container having a readily removable spring locked grill.

A further object is to provide a device of this character having a shiftable meat carrier with novel means for supporting and actuating said meat carrier.

A further object is to provide a device of this character having a food carrying member and opposed heating elements, with means for directing the heat generated by said elements through said member.

With the above and other objects in view, the invention relates to the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 7 is an end view, with parts shown in section, of another form of the device.

Figure 8 is a perspective view illustrating the form of device shown in Figure 7 in position to serve as a hot plate.

Figure 9 is a fragmentary plan view of the removable grill.

Figure 10 is a side view of the driving connection between the roller shafts of the device shown in Figure 7.

Figure 11 is a wiring diagram of the device.

Figure 12 is an end view, with parts shown in section, of another modified form of the device.

Figure 5:
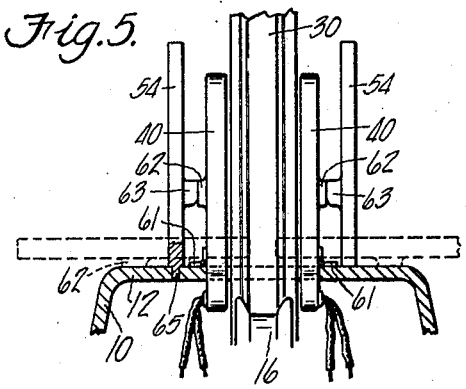
Figure 5 is a fragmentary sectional view similar to Figure 2 illustrating a modified form of the device.
Figure 1:
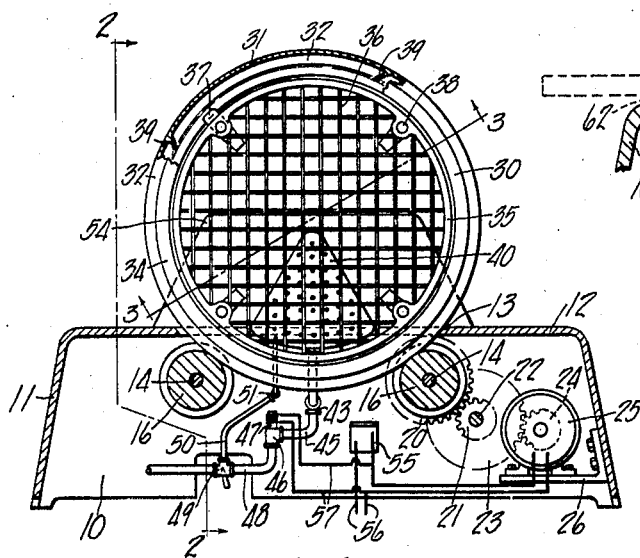
Figure 1 is a view of the device in side elevation with parts shown in section.

Referring to the drawings, and particularly to Figures 1 to 4, the numeral 10 designates a casing having sides 11 and a top 12. An opening 13 is formed substantially centrally of top 12. A pair of spaced parallel horizontal shafts 14 extend transversely of casing 10 adjacent the opposite ends of top opening 13, the ends of said shafts being journaled in suitable bearings or bosses 15 carried by casing sides 11 intermediate the height thereof. A roller 16 is fixedly mounted on each shaft 14 below opening 13, said roller comprising a metal cylinder 17 against which rubber discs 18 bear, said discs being of a diameter greater than that of cylinder 17, and metal discs 19 which bear against the outer faces of said rubber discs to reinforce the same. One of the shafts 14 mounts a gear 20 which meshes with a pinion 21 mounted on a transverse shaft 22 journaled in said casing. Shaft 22 carries a gear 23 which meshes with a pinion 24 carried by the drive shaft of a motor 25 which is supported by a bracket 26 secured to casing 10.

Figure 3:
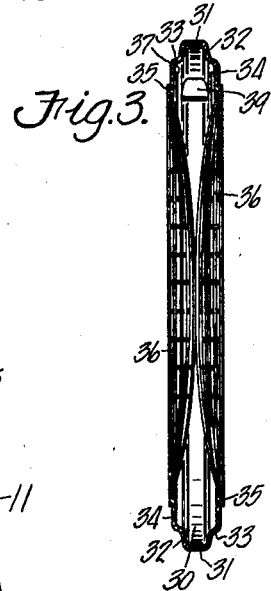
Figure 3 is a transverse sectional view of the meat carrier taken on line 3—3 of Figure 1.
Figure 4:
Figure 4 is an axial sectional view of a roller supporting the meat carrier.

An annular carrier member 30 is adapted to be supported in vertical position for rotation by rollers 16, a portion of said member 30 extending into casing 10 through opening 13. Member 30 is of a channeled cross sectional configuration best illustrated in Figure 3 and comprising a flat central portion 31, from the opposite sides of which said member is inwardly directed at 32, thence outwardly directed at 33, and thence inwardly directed at 34. The rubber discs 18 of rollers 16 bear against the faces 32 of member 30 to support said member in vertical position and to effect a friction driving engagement therewith. Grills are carried at each side of said member 30, said grills preferably comprising an annular frame 35 for a wire screen 36 which is inwardly bent. Screens 36 of opposite grills preferably engage, as shown in Figure 3, and said grills are held to place by locking plates 37 pivoted to frame 35 at 38 and pressed against the inner faces of flanges 34 of member 30 by the spring action of screens 36. A plurality of spaced inwardly directed vanes 39 are carried by member 30 in the channel formed by portions 31 and 32 thereof, for purposes to be hereinafter set forth.

Heating elements 40, supported by top 12 of casing 10, are positioned on opposite sides of and in spaced relation to annular member 30, said heating elements preferably being of sector shape with the arcuate face or side thereof disposed concentric of member 30 and adjacent grill frame 35. In the device illustrated in Figures 1 and 2, heating elements 40 are gas burners which are provided with flanges 41 which engage and are secured to the bottom face of the top 12 of casing 10. Each of the burners has connection with a conduit 42 extending downwardly therefrom to a point below member 30 and thence inwardly to a coupling 43 from which a conduit 45 extends. Conduit 45 has connection with a valve 46 controlled by suitable electrical means, as a solenoid 47. Valve 46 is connected with a gas supply conduit 48. A valve 49 is mounted in conduit 48, and from this valve extends a conduit 50 which is connected with a coupling 51 from which a pair of conduits 52 extend to a position adjacent each burner 40, said conduits 52 each carrying a pilot burner 53. Vertical plates 54 are carried by top 12 of casing 10 along the sides of opening 13 and outwardly of burners 40 to form guards to retain flying grease particles and reflect the heat generated by burners 40.

The device is controlled by a conventional time switch 55 interposed in an electric circuit 56 with which motor 25 is connected. Conductors 57 are connected with circuit 56 and extend to solenoid 47, whereby said solenoid is connected in said circuit in parallel with motor 25.

In the use of the device, meat is placed in annular member 30, and the screen grills are then secured to place by manipulation of lock plates 37, wire screens 36 serving as a spring to retain said lock plates in position and also serving to hold the meat in desired position. Member 30 is then mounted in vertical position on rollers 16 to be operatively supported and positioned thereby. Switch 55 is then set and closed to energize the circuit 56 and thereby actuate motor 25 and one of rollers 16, through the speed reduction gearing, to rotate member 30 slowly; and at the same time to energize solenoid 47 to open gas valve 46 to supply fuel to burners 40, it being understood that the pilot burner 53 is operating to ignite the gas in said burners 40. As the member 30 rotates, the meat is alternately brought into and removed from the heating area provided by burners 40, and all portions of said member 30 are subjected to heat for only a sufficient time to cook meat carried thereby without burning or singeing the same by the open flame of the burners. The sector shape of burners 40 provides a heating element which will equally act upon all pieces of meat in member 30 for the same length of time, regardless of their position in said member relative to the center thereof. After the meat has passed from proximity to burners 40 it is permitted to cool somewhat, the effect of the intermittent heating and cooling being to effectively broil the meat without permitting the same to be exposed to the burner flame for a sufficient time to be burned, and also to retain the meat juices as much as possible. It will be seen that as the juices of the meat are cooked out, they are caused to flow over the entire body of the meat in the course of the rotary movement thereof in member 30, so that such juices will serve to baste the meat automatically, the rotary movement of the meat serving, in large measure, to prevent dripping of the juices therefrom. When the juices do drip from the meat, they collect in the channeled annular member 30 and are carried upwardly in the rotation of said member by vanes 39 to be dropped upon the meat when the vanes are tilted as they approach uppermost position. The plates 54 serve not only to confine flying grease particles, but also to direct the heat of the burners toward member 30 by preventing lateral dissipation thereof.

When the time for which switch 55 has been set expires, the switch operates to open circuit 56 and thereby stop operation of motor 25 and rotation of member 30, and simultaneously to deenergize solenoid 47 to close valve 46 and thus stop operation of burner 40. Member 30 may then be lifted from the device, and one of the screen grills thereof removed to permit removal of the contained broiled meat.

While the device is primarily intended as a meat broiler, it may also be used as a device for cooking many other articles of food, for instance, to toast bread.

Figure 6:
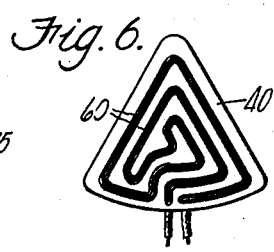
Figure 6 is a side view of an electrical heating member.
Figure 2:
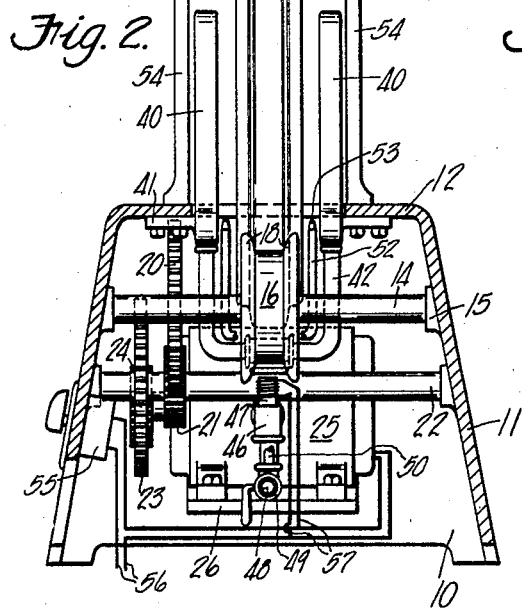
Figure 2 is a fragmentary vertical sectional view taken on line 2—2 of Figure 1.

In Figures 5 and 6 are illustrated a modified construction wherein the heating elements 40 are electrical units provided with an electrical resistance member 60. The heating elements 40 are connected to the top 12 of casing 10 by hinges 61, and are normally vertically positioned. Each heating element 40 is provided with a lug 62 on its outer side in spaced relation to hinge 61 and is adapted for engagement with a lug 63 carried by guard plate 54, the engagement of said lugs 62 and 63 serving to lock the heating units in vertical position. Guard plates 54 are removably mounted on casing 10, and carry pins 65 which fit into suitable recesses in said casing to normally support them in operative vertical position. When guard plates 54 have been removed from the casing, and member 30 has also been removed, the heating elements may be pivoted to horizontal position, in which they are supported by engagement of lugs 62 with top 12 of casing 10, to serve as hot plates. The broiler can thus be constructed to serve a double purpose, and the removability of guard plates 54 facilitates cleaning of the device.

Another form of the device, entirely electrically controlled, is illustrated in Figures 7 to 11. In this form, as in the previously described forms, one of the shafts 14 is driven by a motor through suitable reduction gearing, and each of said shafts 14 which mount rollers 16 carries a pulley 70. These pulleys are interconnected by an endless coil spring 71, whereby both of the rollers are positively driven to insure an operative driving traction with the member 30, the spring 71 serving as a self-tensioning belt.

Member 30, in this form of the device, is of a cross sectional configuration illustrated in Figure 7, and comprises a central arcuate portion 72, from which one side of the member extends laterally outwardly to terminate in an off-set radially inwardly directed flange 73, and from which portion 72 the other side of member 30 extends in arcuate form at 74, the convex face of portion 74 being laterally outwardly disposed. By this construction of member 30, the juices which drip from the meat may be collected and retained by the member at all times. Thus the juices originally collect in portion 72 in the operation of the device, but when member 30 is removed from the device and horizontally disposed to permit removal of the broiled meat therefrom, the member is disposed with side portion 74 lowermost, so that the juices will drain into arcuate sectioned portion 74 without danger of spilling from member 30.

The grill employed in this form of the device comprises an annular frame 35 of a size to fit into member 30 and carries a screen 36. The grill is held to place by a plurality of spaced wire springs 75, each of which is fixedly secured to the frame and to the screen at its ends. The springs 75 extend outwardly of frame 35 at an angle to the plane of said frame and are each provided with an intermediate coiled portion 76. The grills are disposed in the member 30 with the springs 75 outwardly directed, said springs being adapted to flex inwardly to pass within the portions 73 and 74 of member 30 against whose inner faces the coiled spring portions 76 are adapted to bear when operatively positioned. Springs 75 are constructed to hold the grills concentrically of member 30 and in spring pressed engagement in the central plane of said member when meat or food is not mounted therebetween, and the extent of this spring pressure is naturally increased when meat or other feed is interposed therebetween, so that the food will be firmly supported by the grills in a centered position relative to the opposite sides of the member 30.

The electrical heating elements 40 in this form of the device are fixedly carried by guard plates 77 which extend below the top 12 of casing 10 and are pivoted thereto at 78. Guard plates 77 are provided with inwardly directed marginal flanges 79, and the conductors 80 which are electrically connected with heating elements 40 extend through suitable insulation sleeves 81 passing through the lower flange 79. By this construction, the guard plates 77 which are positioned close to member 30, serve to deflect and direct the heat generated by heating elements 40 from side to side through the grilled member 30 and against the food carried thereby; the flanges 79 of said plates serving to retain the major portion of the heat generated. The pivotal mounting of plates 77 permits them to form suitable bases for the heating elements when horizontally disposed, as illustrated in Figure 8, for use as hot plates.

Inasmuch as the drive motor 25 of the device need not be operated when the device is used as a hot plate, and also inasmuch as only one of the heating elements 40 may be required to be used at one time; the device may be wired as diagrammatically illustrated in Figure 11. In this wiring arrangement, a lead conductor 85 extends to a two-way switch 86 from which an oppositely extending conductor 87 extends to one of the heating elements 40. The other terminals of the switch 86 have connection through conductors 88 and 89 with both of the heating elements 40. The other lead conductor 90 is connected with both heating elements 40. Time switch 55 is connected by conductors 91 with lead conductor 85 and conductor 89 in parallel with switch 86. Motor 25 is connected by conductors 92 with lead conductors 85 and 90 in parallel with switch 86, and one of these conductors 92 has a switch 93 disposed therein. In normal operation, two-way switch 86 is actuated to close the circuit between conductors 88 and 89, and switch 93 is closed, whereby closing of time switch 55 will actuate and control the motor 25, and also both of the heating elements 40. When the device is to be used as a hot plate, the switch 93 may be opened to deenergize motor 25, whereby only the heating elements are energized by the control circuit, or, if only one hot plate is desired to be used, time switch 55 may be opened and two-way switch 86 changed to connect conductors 85 and 87.

In the modified form of the device illustrated in Figure 12, casing 10 is provided with an opening in its top into which member 30 extends to be supported and rotated by rollers 16, said member 30 carrying a pair of spring pressed screen grills 36 which hold and position meat or other food to be cooked centrally of member 30, all as heretofore described. Guard plates 77 are carried by the casing 10 adjacent the sides of member 30, and are provided with an outwardly projecting chamber 100 which is positioned in axial alignment with member 30 when said member is operatively positioned. Suitable aligned openings are formed in the guard plates 77 and in the outer wall of chamber 100, and a shaft 101 is mounted loosely in said openings coaxially of member 30. A plate 102 is disposed in each chamber 100 and is fixedly secured to shaft 101 for free movement in said chamber. A coil spring 103 encircles each shaft 101 and bears at its opposite ends on plate 102 and the outer wall of chamber 100, to normally urge shafts 101 inwardly in the direction of each other. The shafts 101 mount heating elements 40 on their inner ends, a portion 104 of said shaft, or other suitable member, projecting from the inner face of element 40 coaxially of member 30. Each of the screen grills 36 carries a metal plate or other suitable bearing member 105 centrally thereof, and projection 104 is normally spring pressed thereagainst. At their upper and lower ends, heating elements 40 carry upwardly and downwardly projecting members 106 which project from the inner face of said elements and curve outwardly therefrom.

In operation, assuming that member 30 is removed from the device, the heating elements 40 are normally pressed inwardly by spring 103 to a position wherein plates 102 bear against guard plates 77. Then, as member 30 is placed in operative position in the device, said member engages the upper of the curved projections 106 carried by heating elements 40 to outwardly shift said members against the action of spring 103 to permit movement of said member 30 to operative position. When member 30 is operatively positioned, the ends of projections 104 carried by heating elements 40 bear on plates 105 carried by screen grills 36, whereby said heating elements are automatically positioned in operative closely spaced relation to the food carried by the grills. In removal of member 30, it engages the lower projections 106 carried by heating elements 40 to thereby urge said elements outwardly sufficiently to permit removal of member 30. The spring pressed engagement of heating element projection 104 with grill carried plate 105 centrally of member 30 minimizes friction of these interengaging parts and permits of self-adjustment of the heating elements with respect to the food to be cooked, irrespective of the thickness of said food. Likewise, this construction also provides for a closely spaced relation of the heating elements with the food, whereby the effectiveness of the heating elements is maximized by minimizing the loss and dissipation of the heat generated thereby in its unconfined radiation through the air between the heating element and the article to be cooked.

The invention having been set forth, what is claimed as new and useful is:—

1. In a cooking device, spaced heating elements, an annular member positioned intermediate said elements, means for peripherally supporting and rotating said member, and means carried by said member for positioning food within said member and between the planes of the side edges thereof, said heating elements having the shape of a sector and being disposed concentrically of said member whereby all portions of the food disposed in said member are subjected to the heat of said elements for an equal period of time during each rotation of said member.

2. In a cooking device, spaced heating elements, an annular member positioned intermediate said elements, a common means for peripherally supporting and rotating said member, and means carried by said member for positioning food within said member and between the planes of the side edges thereof, said heating elements being of a size smaller than and positioned to one side of said member whereby food carried by said member intermittently passes adjacent said heating elements.

3. In a food revolving cooking device having heating means, a revolvable self-contained food carrier having a peripheral wall enclosing a laterally substantially open hollow interior for exposing food to said heating means and an exterior shaped to guide said carrier in a revolving motion while permitting substantially unobstructed insertion and removal of the carrier into and from its operating position adjacent said heating means, and means carried by the wall of said carrier for supporting food in said hollow interior, said peripheral carrier wall constituting an inwardly open channel-shaped container retaining juices dropping from said food while revolving.

4. In a food revolving cooking device having heating means, a revolvable self-contained food carrier having a peripheral wall enclosing a laterally substantially open hollow interior for exposing food to said heating means and an exterior shaped to guide said carrier in a revolving motion while permitting substantially unobstructed insertion and removal of the carrier into and from its operating position adjacent said heating means, means carried by the wall of said carrier for supporting food in said hollow interior, said peripheral carrier wall constituting an inwardly open channel-shaped container retaining juices dropping from said food while revolving, and means on said carrier for returning said juices to food supported therein while said carrier is revolved.

5. In a food revolving cooking device comprising a support, a removable self-contained food carrier revolvably mounted on said support and having a peripheral wall enclosing a laterally substantially open hollow interior for exposing food held therein, said carrier constituting a container for retaining juices dropping from said food, and heating means movably mounted on said support to constitute two heating elements disposed on the opposite sides of the hollow interior of said carrier, said heating means being movable to a common plane above said support to serve as a plane heating surface upon removal of said carrier.

6. In a food revolving cooking device comprising a support, a removable self-contained food carrier revolvably mounted on said support and having a peripheral wall enclosing a laterally substantially open hollow interior for exposing food held therein, said carrier constituting a container for retaining juices dropping from said food, and heating means movably mounted on said support to constitute two substantially vertical heating surfaces disposed on the opposite sides of the hollow interior of said carrier, said heating means being movable to a horizontal plane above said support to serve as a horizontal heating surface upon removal of said carrier.

7. In a cooking device, a support, heating means mounted on said support and constituting two heating elements spaced by a gap, guiding means on said support, a removable self-contained food carrier having a peripheral wall enclosing a laterally substantially open hollow interior space for supporting food therein, said carrier having a guiding surface shaped to permit substantially unobstructed insertion and removal of said carrier into and from said gap for removable engagement of said guiding means in a position in which said carrier is confined by said guiding means to a revolving motion for consecutively exposing successive portions of said interior space to said heating elements, and means for driving said carrier to revolve in said position.

8. In a cooking device, spaced heating elements, a vertical annular food carrying member positioned intermediate said elements, and means peripherally supporting and rotating said member, whereby said member is readily removable by lifting the same from said means.

9. In a cooking device, spaced heating elements, an annular food carrying member positioned intermediate said elements said member comprising a channel and oppositely bent portions in section, and means for peripherally engaging said member for vertically supporting and rotating the same.

10. In a cooking device, spaced heating elements, a vertical annular food carrying member removably positioned intermediate said elements, and means for rotating said member about an axis perpendicular thereto, said member being of a cross sectional configuration including a pair of channels whose median lines at any point thereof are relatively angularly disposed, one of said channels serving to normally collect and retain juices cooked from the food, and the other channel serving to retain said juices when said member is horizontally positioned.

11. In a cooking device, spaced heating elements, a normally vertically positioned annular food carrying member removably positioned between said elements and rotatable about an axis perpendicular thereto, and means for rotating said member, said member being of channeled cross section to collect food juices, and having a laterally inwardly directed flange formed at one side thereof to retain said juices when said member is horizontally positioned.

12. In a cooking device, an annular food carrying member, means for rotating said member about its central axis, a pair of grills carried by said member, spring members carried by said grills and engaging said annular member to removably mount said grills in said member, said springs urging said grills in the direction of each other to retain said grills substantially centrally of said annular member, and means positioned opposite said grills for applying heat to the food carried by said member.

13. In a cooking device, an annular food carrying member having inwardly directed sides, means for rotating said member about its center, a pair of grills removably disposed in said member, springs carried by said grills and engaging said sides to concentrically position said grills, said grills being adapted to hold an article of food therebetween centrally of the planes of the sides of said member, and heating elements positioned adjacent said grills.

14. In a cooking device, an annular food carrying member, means for rotating said member about its center, a pair of grills removably insertible in said member, a plurality of springs carried by each grill and extending radially and laterally outwardly of said grill into engagement with said member to position said grills concentrically of said member and intermediate the planes of the sides of said member, and heating members positioned adjacent said grills.

15. In a cooking device, a support, a pair of spaced vertical heating elements pivotally mounted on said support, an annular food carrying member removably positioned intermediate said heating elements, and means carried by said support for peripherally engaging said member for rotation, said heating elements being shiftable to horizontal position above said means on said support to serve as hot plates upon removal of said member.

16. In a broiling device, a pair of axially spaced rollers, an annular food carrying member supported in vertical position on said rollers and exposed to atmosphere, means for rotating at least one of said rollers for rotating said circular member, and means for supplying heat to said food carrying member.

17. In a cooking device, a vertical rotatable member, a support means carried by said support for removably supporting and rotating said member, heating elements pivotally mounted on said support and normally positioned vertically adjacent said rotatable member, said elements being shiftable to horizontal position to serve as hot plates, time controlled means for controlling the action of said first named means and said heating elements in predetermined timed relation, and means for independently energizing said heating elements.

18. In a cooking device, a support, an annular food carrying member, means carried by said support for peripherally supporting said annular member in vertical position whereby said member is removable in a direction angular to its axis, means actuating said last named means for rotating said member, and a heating element positioned adjacent each side of said member and carried by said support.

19. In a cooking device, a support, an annular food carrying member, said support including means for peripherally supporting said member for rotation whereby said member is removable from said support by movement perpendicular to its axis of rotation, and a pair of heating elements positioned adjacent the planes of opposite sides of said member and intermediate projections of the inner outline of said member.

20. In a cooking device, a support, an annular food carrying member, said support including means for peripherally supporting said member for rotation whereby said member is removable from said support by movement perpendicular to its axis of rotation, and sector-shaped heating elements positioned concentrically of said member adjacent the planes of opposite sides thereof and intermediate projections of the center and the lower portion of the inner outline of said member.

21. In a cooking device, spaced heating elements, an annular food carrier positioned intermediate said elements and including opposed side portions, and means for peripherally supporting and rotating said carrier whereby the entire area of said side portions is exposed to said heating elements on rotation and whereby said carrier is readily removable by lifting the same from said means.

22. In a cooking device, a support, a pair of spaced normally vertical heating elements, and annular food carrying member removably positioned intermediate said elements, and means carried by said support for peripherally engaging said member for rotation, said elements being pivoted at an intermediate point thereof to said support and shiftable to horizontal position to serve as hot plates upon removal of said member.

23. In a cooking device, a support having an opening therein, a pair of spaced rollers carried by said support and positioned below said opening, an annular food carrying member removably supported in vertical position for rotation on said rollers, and a pair of heating elements extending into said opening on opposite sides of said member and pivoted to said support, said elements being shiftable to horizontal position upon removal of said member.

24. In a cooking device, a support having an opening therein, a pair of spaced rollers carried by said support and positioned below said opening, an annular food carrying member removably supported in vertical position for rotation on said rollers, and a pair of heating elements positioned on opposite sides of said member and extending through said opening.

25. In combination, a casing having an opening therein, a pair of rollers journaled in said casing, an annular member extending through said opening and vertically supported by said rollers, drive means for rotating at least one of said rollers to rotate said member, grills removably carried by opposite sides of said annular member, and heating elements carried by said casing on opposite sides of said member and adjacent said grills.

26. In combination, a pair of axially spaced rollers, a circular food-carrying member supported in vertical position on said rollers, drive means connected with at least one of said rollers for rotating said member, and a heating element of sector shape positioned concentrically of and adjacent the lower portion of one side of said circular member.

27. In a broiling device, an annular member of channel section, a vane carried by said member and positioned in said channel, circular grills carried by the sides of said member for holding food, means peripherally supporting said member in vertical position for rotation, and a heating element positioned adjacent each grille, said rotating channeled member and vane serving to collect and convey juices from the food to a point adjacent the upper end of said member to be dropped onto the food.

28. In combination, a support, axially spaced rollers journaled in said support, means for rotating at least one of said rollers, an annular member supported on said rollers for rotation, a grill mounted in said member, and heating elements carried by said support on opposite sides of said member adjacent said grill and extending in one direction from the center of said member.

29. In a broiling device, an annular food carrier having radially inwardly directed flanges at opposite sides thereof, a pair of axially spaced rollers supporting said carrier for rotation, said rollers including flanges having frictional face contacting engagement with the flanges of said annular carrier for operatively positioning said carrier relative to said rollers.

30. In a cooking device, a support, heating means mounted on said support and constituting two heating elements spaced by a gap, guiding means on said support, a removable self-contained food carrier having a peripheral wall enclosing a laterally substantially open hollow interior space for supporting food therein, said carrier having a guiding surface shaped to permit substantially unobstructed insertion and removal of said carrier into and from said gap for removable engagement with said guiding means in a position in which said carrier is confined to a revolving motion exposing said interior space to said heating elements, and means for driving said carrier to revolve in said position.

31. In a cooking device, a support, heating means mounted on said support and constituting two heating elements spaced by a gap, guiding means on said support, a removable self-contained food carrier having a peripheral wall enclosing a laterally substantally open hollow interior space for supporting food therein, said carrier having a guiding surface being shaped to permit substantially unobstructed insertion and removal of said carrier into and from said gap for removable engagement with said guiding means in a position in which said carrier is confined to a revolving motion exposing said interior space to said heating elements, and means for driving said carrier to revolve in said position, the interior side of said carrier constituting a container retaining juices dropping from food supported in said interior space.

32. In a cooking device, a support, heating elements mounted on said support and constituting two heating surfaces spaced by a gap, guiding means on said support, a removable self-contained food carrier having a peripheral wall enclosing a laterally substantially open hollow interior space for supporting food therein, said carrier having a guiding surface shaped to permit substantially unobstructed insertion and removal of said carrier into and from said gap for removable engagement with said guiding means in a position in which said carrier is confined to a revolving motion exposing said interior space to said heating elements, and means for driving said carrier to revolve in said position, the interior of said carrier constituting a container retaining juices dropping from food supported in said interior space and to return said juices to said food.

33. In a cooking device, a support, heating elements mounted on said support and constituting two heating surfaces spaced by a gap, guiding means on said support, a removable self-contained food carrier having a peripheral wall enclosing a laterally substantially open hollow interior space for supporting food therein, said carrier having a guiding surface shaped to permit substantially unobstructed insertion and removal of said carrier into and from said gap for removable engagement with said guiding means in a position in which said carrier is confined to a revolving motion exposing said interior space to said heating elements, and means for driving said carrier to revolve in said position, the interior of said carrier constituting a container retaining juices dropping from food in said carrier while said carrier is revolving, and retaining said juices while said carrier is tilted from said revolving position.

34. In a cooking device, a support, heating elements mounted on said support and constituting two heating surfaces spaced by a gap, guiding means on said support, a removable self-contained food carrier having a peripheral wall enclosing a laterally substantially open hollow interior space for supporting food therein, said carrier having a guiding surface shaped to permit substantially unobstructed insertion and removal of said carrier into and from said gap for removable engagement with said guiding means in a position in which said carrier is confined to a revolving motion exposing said interior space to said heating elements, and means for driving said carrier to revolve in said position, the interior of said carrier constituting a container shaped to retain juices dropping from food supported in said interior space and to return said juices to said food while revolving, and to retain said juices in a horizontal position.

35. In a cooking device, a support, heating elements mounted on said support and constituting two heating surfaces spaced by a gap, guiding means on said support, a removable self-contained food carrier having a peripheral wall enclosing a laterally substantially open hollow interior space for supporting food therein, a guideway on said peripheral wall, said carrier and said guide-way being shaped to permit substantially unobstructed insertion and removal of said carrier into and from said gap for removable engagement of said guide-way with said guiding means in a position in which said carrier is confined to a revolving motion exposing said interior space to said heating elements, and means for driving said carrier to revolve in said position, the interior side of said wall constituting a channel shaped to retain juices dropping from food supported in said interior space while revolving.

36. In a cooking device, a support, heating elements mounted on said support and constituting two substantially vertical heating surfaces spaced by a gap, guiding means on said support, a removable self-contained food carrier having a peripheral wall enclosing a laterally substantially open hollow interior space for supporting food therein, said carrier having a guiding surface shaped to permit substantially unobstructed insertion and removal of said carrier into and from said gap for removable engagement with said guiding means in a position in which said carrier is confined to a revolving motion exposing said interior space to said heating elements, and means for driving said carrier to revolve in said position, the interior of said carrier constituting a container retaining juices dropping from food supported in said interior space.

37. In a cooking device, a support, heating elements mounted on said support and constituting two substantially vertical heating surfaces spaced by a gap, guiding means on said support, a removable self-contained food carrier having a peripheral wall enclosing a laterally substantially open hollow interior space for supporting food therein, a guide-way on said peripheral wall, said carrier and said guide-way being shaped to permit substantially unobstructed insertion and removal of said carrier into and from said gap for removable engagement of said guide-way with said guiding means in a position in which said carrier is confined to a revolving motion exposing said interior space to said heating elements, and means for driving said carrier to revolve in said position, the interior side of said wall constituting a channel shaped to retain juices dropping from food supported in said interior space while revolving.

38. In a cooking device, a support, heating elements mounted on said support and constituting two substantially vertical heating surfaces spaced by a gap, guiding means on said support, a removable self-contained food carrier having a peripheral wall enclosing a laterally substantially open hollow interior space for supporting food therein, said carrier having a guiding surface shaped to permit substantially unobstructed insertion and removal of said carrier into and from said gap for removable engagement with said guiding means in a position in which said carrier is confined to a revolving motion intermittently exposing different consecutive sections of said interior space to said heating elements, and means for driving said carrier to revolve in said position, the interior side of said carrier constituting a container retaining juices dropping from food supported in said interior space.

39. In a cooking device, a support, heating elements mounted on said support and constituting two substantially vertical heating surfaces spaced by a gap, guiding means on said support, a removable self-contained food-carrier having a peripheral wall enclosing a laterally substantially open hollow interior space for supporting food therein, said carrier having a guiding surface shaped to permit substantially unobstructed insertion and removal of said carrier into and from said gap for removable engagement with said guiding means in a position in which said carrier is confined to a revolving motion exposing said interior space to said heating elements, and means for driving said carrier to revolve in said position, the interior of said carrier constituting a container retaining juices dropping from food supported in said interior space and returning said juices to said food.

40. In a cooking device, a support, heating elements mounted on said support and constituting two substantially vertical heating surfaces spaced by a gap, guiding means on said support, a removable self-contained food carrier having a peripheral wall enclosing a laterally substantially open hollow interior space for supporting food therein, a guide-way on said peripheral wall, said carrier and said guide-way being shaped to permit substantially unobstructed insertion and removal of said carrier into and from said gap for removable engagement of said guide-way with said guiding means in a position in which said carrier is confined to a revolving motion exposing said interior space to said heating elements, and means for driving said carrier to revolve in said position, the interior side of said wall constituting a channel shaped to retain juices dropping from food supported in said interior space and to return said juices to said food while revolving.

41. In a cooking device, a support, heating elements mounted on said support and constituting two substantially vertical heating surfaces spaced by a gap, guiding means on said support, a removable self-contained food carrier having a peripheral wall enclosing a laterally substantially open hollow interior space for supporting food therein, said carrier having a guiding surface shaped to permit substantially unobstructed insertion and removal of said carrier into and from said gap for removable engagement with said guiding means in a position in which said carrier is confined to a revolving motion exposing said interior space to said heating elements, and means for driving said carrier to revolve in said position, the interior of said carrier constituting a container retaining juices dropping from food in said interior space and returning said juices to said food while revolving in a vertical position.

42. In a cooking device, a support, heating elements mounted on said support and constituting two substantially vertical heating surfaces spaced by a gap, guiding means on said support, a removable self-contained food carrier having a peripheral wall enclosing a laterally substantially open hollow interior space for supporting food therein, a guide-way on said peripheral wall, said carrier and said guide-way being shaped to permit substantially unobstructed insertion and removal of said carrier into and from said gap for removable engagement of said guide-way with said guiding means in a position in which said carrier is confined to a revolving motion exposing said interior space to said heating elements, and means for driving said carrier to revolve in said position, the interior side of said wall constituting a channel shaped to retain juices from food in said interior space while in vertical and horizontal positions and to return said juices to said food while revolving and in a vertical position.

CHARLES T. WADE.